(12) United States Patent
Kuang et al.

(10) Patent No.: US 7,236,873 B2
(45) Date of Patent: Jun. 26, 2007

(54) SYSTEM AND METHOD OF CONTROLLING A HYBRID ELECTRIC VEHICLE

(75) Inventors: Ming Kuang, Canton, MI (US); Fazal Syed, Canton, MI (US); Eric Tseng, Canton, MI (US); Prabhakar Patil, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 11/161,054

(22) Filed: Jul. 21, 2005

(65) Prior Publication Data

US 2006/0016631 A1 Jan. 26, 2006

Related U.S. Application Data

(60) Provisional application No. 60/590,468, filed on Jul. 23, 2004.

(51) Int. Cl.
*G06F 17/00* (2006.01)
*B60K 6/00* (2006.01)
*B60K 41/02* (2006.01)

(52) U.S. Cl. .................. 701/110; 701/22; 180/65.2

(58) Field of Classification Search ................ 701/110, 701/114, 101, 102; 180/65.1, 65.2, 65.3; 477/14, 15, 20, 5
See application file for complete search history.

(56) References Cited

U.S. PATENT DOCUMENTS

| 4,165,795 A | 8/1979 | Lynch et al. ............... 180/65.2 |
| 6,512,967 B2 | 1/2003 | Oestberg et al. ........... 180/65.1 |
| 6,746,366 B2* | 6/2004 | Tamor ....................... 180/65.2 |
| 2004/0249525 A1 | 12/2004 | Okoshi et al. ................ 701/22 |
| 2006/0025906 A1* | 2/2006 | Syed et al. .................... 701/22 |

FOREIGN PATENT DOCUMENTS

| EP | 1 316 460 A1 | 6/2003 |
| JP | 9150638 | 6/1997 |
| JP | 2005-16547 A | * 1/2005 |

* cited by examiner

*Primary Examiner*—Hieu T. Vo
(74) *Attorney, Agent, or Firm*—David B. Kelley; Brooks Kushman P.C.

(57) ABSTRACT

A system and method of controlling engine torque in a hybrid electric vehicle. The method includes comparing an engine speed command to a maximum engine speed command, comparing an engine speed value to the engine speed command, and adjusting the engine torque command if the engine speed command is within a predetermined threshold to the maximum engine speed command and the engine speed exceeds the engine speed command by at least a predetermined amount.

20 Claims, 2 Drawing Sheets

SYSTEM AND METHOD OF CONTROLLING A HYBRID ELECTRIC VEHICLE

CROSS-REFERENCE TO RELATED APPLICATIONS

This application claims the benefit of U.S. provisional application Ser. No. 60/590,468 filed Jul. 23, 2004.

BACKGROUND OF THE INVENTION

1. Field of the Invention

The present invention relates generally to the control of a hybrid electric vehicle, and more specifically to a system and method of selectively controlling engine speed in a hybrid electric vehicle.

2. Background Art

Hybrid electric vehicles may include a generator that is used to control the speed of an engine. The generator may not have sufficient torque to control engine speed if there is insufficient power available to drive the generator or if operating temperatures sufficiently degrade generator performance. Previously, these problems were accounted for by "oversizing" the generator and/or engine or by limiting generator and engine output under all operating conditions. These oversized components increased cost and weight, both of which are undesirable in motor vehicle applications.

SUMMARY OF THE INVENTION

In at least one embodiment of the present invention, a method of controlling engine torque in a hybrid electric vehicle is provided. The method includes comparing an engine speed command to a maximum engine speed command, comparing an engine speed value to the engine speed command, and adjusting an engine torque command when the engine speed command is sufficiently close to the maximum engine speed command and the engine speed exceeds the engine speed command by at least a predetermined amount.

In at least one embodiment, the method may include the steps of determining whether the engine speed command is within a predetermined range of the maximum engine speed command, determining whether the engine speed exceeds the engine speed command by at least the predetermined amount, calculating an error value when the engine speed command is within the predetermined range and the engine speed exceeds the engine speed command by at least the predetermined amount, determining a torque adjustment value based on the error value, and updating the engine torque command value based on the torque adjustment value.

In at least one other embodiment of the present invention, a system for controlling torque in a hybrid electric vehicle is provided. The system includes primary and secondary power sources, a power transfer system, and a control system. The power transfer system is adapted to be powered by at least one of the primary and secondary power sources to drive a vehicle traction wheel. The control system controls operation of the power transfer system and primary and secondary power sources and processes signals indicative of a primary power source speed command, a maximum primary power source speed command, and an primary power source speed. The control system decreases output torque of the primary power source when the primary power source speed command is sufficiently close to the maximum primary mary power source speed command and the primary power source speed exceeds the primary power source speed command by at least a predetermined amount.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
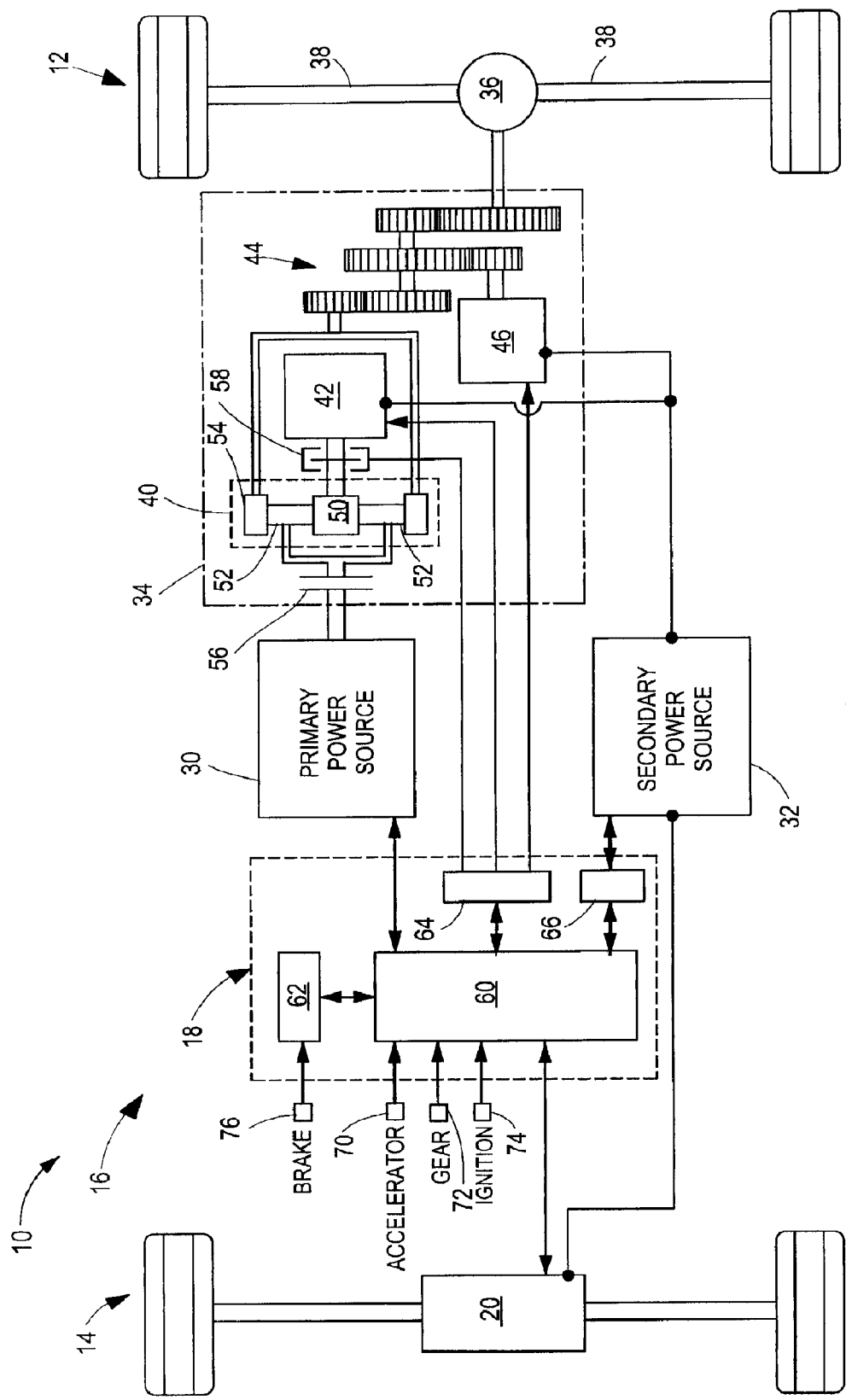
FIG. 1 is a schematic of an exemplary hybrid electric vehicle.

Referring to FIG. 1, a schematic of a hybrid electric vehicle 10 is shown. The hybrid electric vehicle 10 includes a first wheel set 12, a second wheel set 14, a wheel drive system or powertrain 16, and a control system 18.

The powertrain 16 may be configured to drive or provide torque to the first and/or second wheel sets 12,14. In the embodiment shown, the first wheel set 12 is configured to be driven by the powertrain 16 while the second wheel set 14 is configured to be driven by an electrical machine 20, such as an electric motor. Alternatively, the second wheel set 14 may be provided without an electrical machine 20 in other embodiments of the present invention.

The hybrid electric vehicle 10 may include any suitable number of power sources. In the embodiment shown in FIG. 1, the hybrid electric vehicle 10 includes a primary power source 30 and a secondary power source 32.

The primary power source 30 may be any suitable energy generation device, such as an internal combustion engine adapted to combust any suitable type of fuel like gasoline, diesel fuel, or hydrogen.

The secondary power source 32 may be any suitable source of electrical energy. For example, an electrical power source such as a battery, a battery pack having a plurality of electrically interconnected cells, capacitor, or a fuel cell may be utilized. If a battery is used it may be of any suitable type, such as nickel-metal hydride (Ni-MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art. Alternatively, the secondary power source 32 may include one or more non-electrical devices whose energy may be converted to electrical energy. For instance, a hydraulic power source or mechanical power source such as a flywheel, spring, engine, or compressed gases may be used to power an electrical machine, such as a motor, to provide electrical energy. For simplicity, the description below will primarily refer to an embodiment of the present invention that incorporates an electrical power source.

The primary and secondary power sources 30,32 may be adapted to provide power to a power transfer system 34 and/or electrical machine 20. In the embodiment shown, the power transfer system 34 is configured as a parallel-series transmission, also referred to as an electronic converterless transmission (e-CVT).

The power transfer system 34 is adapted to drive one or more vehicle wheels. In at least one embodiment, the power transfer system 34 may be connected to a differential 36 in any suitable manner, such as with a driveshaft, chain, or other mechanical linkage. The differential 36 may be connected to each wheel of the first wheel set 12 by one or more shafts 38, such as an axle or halfshaft.

The power transfer system 34 may include various mechanical, electrical, and/or electromechanical devices. In the embodiment shown, the power transfer system 34 includes a planetary gear assembly 40, a first electrical machine 42, a power transfer unit 44, and a second electrical machine 46 as primary components.

The planetary gear assembly 40 may have any suitable configuration. In the embodiment shown, the planetary gear assembly 40 includes a sun gear 50, a plurality of planet gears 52, and a ring gear 54.

The primary power source 30 may be selectively coupled to the planetary gear assembly 40 via a clutch 56. The clutch 56 maybe of any suitable type, such as a one way clutch that permits the primary power source 30 to drive the planetary gear assembly 40. If the clutch 56 is engaged, the primary power source 30 may rotate the planet gears 52 of the planetary gear assembly 40. Rotation of the planet gears 52 may then rotate the ring gear 54. The ring gear 54 may be coupled to the power transfer unit 44 that are coupled to the differential 36 for transmitting torque to vehicle drive wheels to propel the hybrid electric vehicle 10. The power transfer unit 44 may include a plurality of gear ratios that may be engaged to provide a desired vehicle response.

The first electrical machine 42, which may be a motor or motor-generator, may be coupled to the sun gear 50 to provide torque to supplement or counteract torque provided by the primary power source 30. A brake 58 may be provided to reduce the speed and/or the transmission or torque from the first electrical machine 42 to the sun gear 50.

The second electrical machine 46 may be powered by the secondary power source 32 and/or the first electrical machine 42. The second electrical machine 46, which may be a motor, may be coupled to the power transfer unit 44 to propel the hybrid electric vehicle 10.

The control system 18 may monitor and/or control various aspects of the hybrid electric vehicle 10. The control system 18 may have any suitable configuration. For example, the control system 18 may include one or more controllers or control modules. In the embodiment shown in FIG. 1, the control system 18 includes a vehicle system control module 60, a brake system control module 62, a transmission control module 64, and a secondary power source control module 66.

The vehicle system control module 60 may communicate with the primary power source 30, second electrical machine 46, brake system control module 62, transmission control module 64, and/or the secondary power source control module 66 to monitor and/or control operation of various vehicle systems, subsystems, and components. In addition, the vehicle system control module 60 may receive signals from various components. For example, the vehicle system control module 60 may receive a signal from an accelerator pedal sensor 70, a gear selector sensor 72, and/or an ignition or vehicle start sensor 74. The accelerator pedal sensor 70 may provide a signal indicative of the vehicle acceleration demanded by the driver. The gear selector sensor 72 may detect the position of a driver-operated gear selector, such as a shift lever that is used to shift or select a gear ratio or propulsion direction of the power transfer system 34. The vehicle start sensor 74 may provide a signal indicative of a request for startup or shutdown of the vehicle powertrain 16, power sources 30,32, and/or various electrical components.

The brake system control module 62 may monitor and control various aspects of a braking system, such as brake actuation. In addition, the brake system control module 62 may receive a signal from a brake pedal sensor 76 indicative of braking demanded by the driver.

The transmission control module 64 may monitor and control operation of the power transfer system 34. For example, the transmission control module 64 may communicate with the first electrical machine 42, second electrical machine 46, and/or brake 58.

The secondary power source control module 66 may monitor and control various aspects of the secondary power source 32, such as charging, discharging, and/or actuation of one or more electrical connection switches, such as a contactor.

Figure 2:
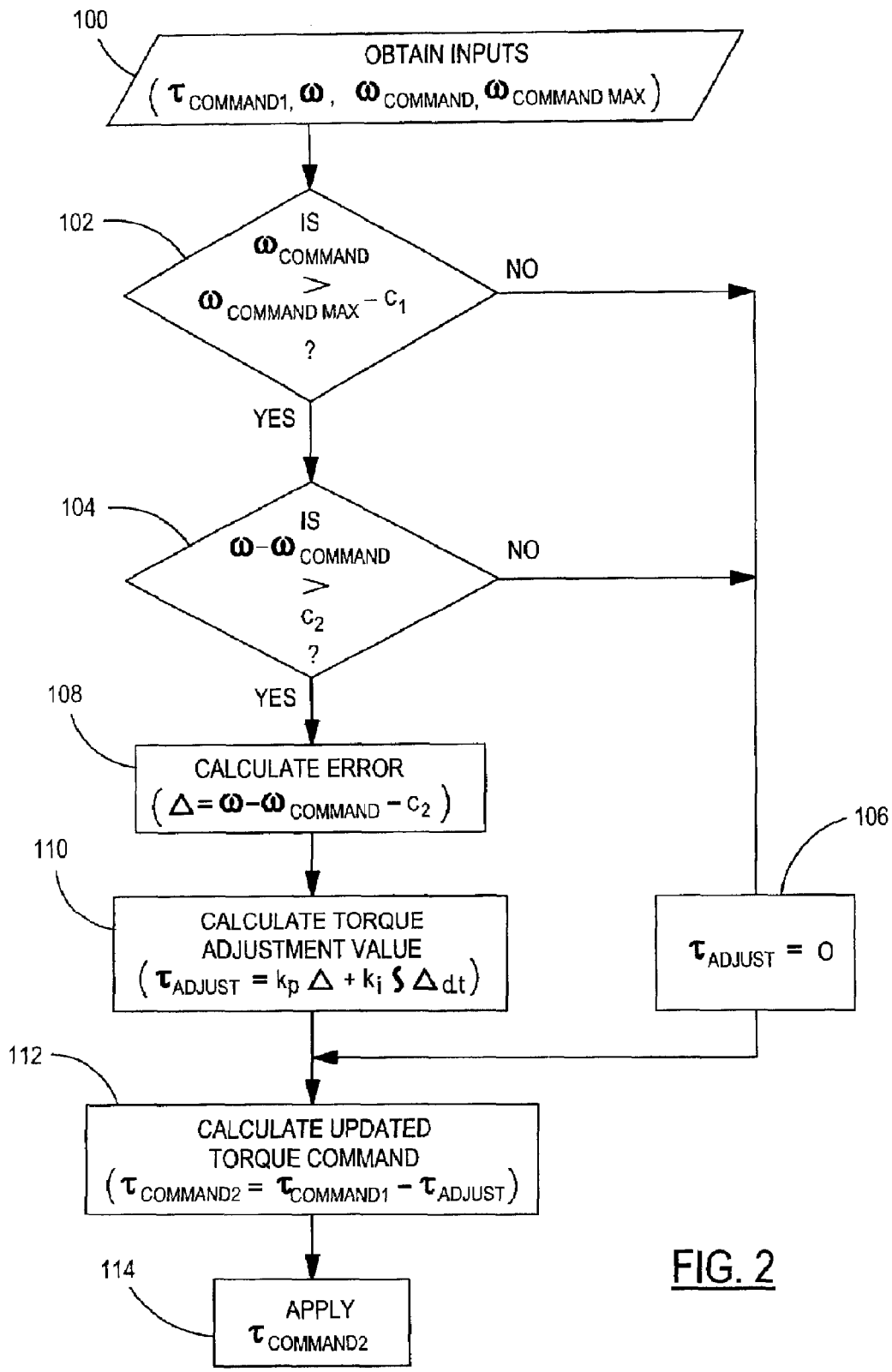
FIG. 2 is a flowchart of a method of controlling the speed of an engine in the hybrid electric vehicle.

Referring to FIG. 2, a flowchart of a method for controlling a primary power source of a hybrid electric vehicle is shown. As will be appreciated by one of ordinary skill in the art, the flowcharts represent control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

At 100, the method begins by obtaining various input signals, including a current engine torque command ($T_{COMMAND\ 1}$), an engine speed value ($\omega$), an engine speed command ($\omega_{COMMAND}$), and a maximum engine speed command ($\omega_{COMMAND\ MAX}$). The engine torque and engine speed commands, $T_{COMMAND\ 1}$ and $\omega_{COMMAND}$, may be based on various parameters, such as signals from the accelerator pedal sensor 70, brake pedal sensor 76, and/or the state of charge of the secondary power source 52. The engine speed value, $\omega$, may be determined in various ways. For example, the engine speed value may be based on a signal from an engine speed sensor or may be determined as a function of vehicle and generator speed. The maximum engine speed command, $\omega_{COMMAND\ MAX}$, may be vary with vehicle speed and may be based on vehicle speed and the selected gear ratio. Moreover, $\omega_{COMMAND\ MAX}$ may be calculated using suitable control logic or determined by the control system 18 in any suitable manner, such as by using a microprocessor or a look-up table.

At 102, method determines if the engine speed command is sufficiently close to the maximum engine speed command based on the following expression:

$$\omega_{COMMAND} > \omega_{COMMAND\ MAX} - C_1$$

where:

$C_1$ is a constant, $\omega_{COMMAND}$ is the engine speed command, and $\omega_{COMMAND\ MAX}$ is the maximum engine speed command.

$C_1$ may be a predetermined constant based on development testing or vehicle operating parameters. If $\omega_{COMMAND}$ is greater than $\omega_{COMMAND\ MAX} - C_1$, then the method continues at block 104. If $\omega_{COMMAND}$ is not greater than $\omega_{COMMAND\ MAX} - C_1$, then the method continues at block 106.

At 104, the method determines whether the engine speed exceeds the engine speed command by a predetermined amount based on the expression:

$$\omega - \omega_{COMMAND} > C_2$$

where:

$C_2$ is a constant, $\omega$ is the engine speed value, and $\omega_{COMMAND}$ is the engine speed command.

$C_2$, may be a predetermined constant based on development testing or vehicle operating parameters. If $\omega - \omega_{COMMAND}$ is greater than $C_2$, then the method continues at block 108. If $\omega - \omega_{COMMAND}$ is not greater than $C_2$, then the method continues at block 106.

At 106, an engine torque adjustment value ($T_{ADJUST}$) is set equal to zero before the method continues at block 112.

At 108, an error value ($\Delta$) is calculated based on the following expression:

$$\Delta = \omega - \omega_{COMMAND} - C_2$$

where:

$\Delta$ is the error value, $C_2$ is a constant, $\omega$ is the engine speed value, and $\omega_{COMMAND}$ is the engine speed command.

At 110, a torque adjustment value ($T_{ADJUST}$) is calculated based on the following expression:

$$T_{ADJUST} = k_p \Delta + k_i \int \Delta dt$$

where:

$T_{ADJUST}$ is the torque adjustment value, $k_i$ is an integral gain value, $k_p$ is an proportional gain value, and $\Delta$ is the error value.

The integral and proportional gain values, $k_i$ and $k_p$, may be constants or variables. Variable integral and proportional gain values may be based on one or more vehicle operating parameters, such as engine speed, and may be determined in any suitable manner, such as using an equation or a look-up table in a manner known by those skilled in the art.

At 112, the engine torque command is updated based on the following expression:

$$T_{COMMAND\ 2} = T_{COMMAND\ 1} - T_{ADJUST}$$

where:

$T_{COMMAND\ 1}$ is the current torque command, $T_{COMMAND\ 2}$ is the updated torque command, and $T_{ADJUST}$ is the torque adjustment value.

As is apparent from the expression above, the updated engine torque command is determined by decreasing the current torque command by the amount of the torque adjustment value. As such, this step may be used to decrease the desired engine output torque when the conditions in blocks 102 and 104 are both satisfied.

At 114, the updated engine torque command ($T_{COMMAND\ 2}$) is applied. For example, the updated engine torque command may be provided to the engine or used to command the engine to provide the amount of torque indicated by the updated engine torque command. Moreover, the current torque command may be set equal to the updated torque command prior to application and/or repeating the steps of the method.

The present invention helps maintain control of engine speed by limiting engine torque under operating conditions where electrical machine or generator output may be impaired. Moreover, by selectively adjusting the engine torque command, the present invention permits a vehicle to be configured with components, such as an engine and/or generator, that are not oversized, thereby helping reduce cost and/or weight. In addition, the present invention utilizes actual or detected operating conditions, such as engine speed, rather than predicted values. As such, the present invention helps reduce or eliminate the error that may be associated with such predictions and may more accurately account for current operating and/or environmental conditions.

While the best mode for carrying out the invention has been described in detail, those familiar with the art to which this invention relates will recognize various alternative designs and embodiments for practicing the invention as defined by the following claims.

What is claimed is:

1. A system for controlling torque in a hybrid electric vehicle, the system comprising:

primary and secondary power sources;

a power transfer system adapted to be powered by at least one of the primary and secondary power sources to drive a vehicle traction wheel; and a control system for controlling operation of the power transfer system and primary and secondary power sources, the control system being configured to process signals indicative of a primary power source speed command, a maximum primary power source speed command, and a primary power source speed;

wherein the control system decreases output torque of the primary power source when the primary power source speed command is sufficiently close to the maximum primary power source speed command and the primary power source speed exceeds the primary power source speed command by at least a predetermined amount.

2. The system of claim 1 further comprising an accelerator pedal sensor and a brake pedal sensor, wherein the primary power source speed command is based on signals from the accelerator pedal sensor, brake pedal sensor, and a state of charge signal indicative of a state of charge of the secondary power source.

3. The system of claim 1 wherein the power transfer system includes a powersplit transmission.

4. The method of claim 3 wherein the maximum primary power source speed command is based on signals indicative of a speed of the hybrid electric vehicle and a selected gear ratio of the powersplit transmission.

5. A method of controlling engine torque in a hybrid electric vehicle, the method comprising:

determining whether an engine speed command is within a predetermined range of a maximum engine speed command;

determining whether an engine speed exceeds the engine speed command by at least a predetermined amount;

calculating an error value when the engine speed command is within the predetermined range and the engine speed exceeds the engine speed command by at least the predetermined amount;

determining a torque adjustment value based on the error value; and updating an engine torque command value based on the torque adjustment value to reduce engine speed.

6. The method of claim 5 wherein the error value is based on the engine speed, engine speed command, and second predetermined constant value.

7. The method of claim 5 wherein the engine torque adjustment value is based on the error value and proportional and integral gain values.

8. The method of claim 5 wherein the hybrid electric vehicle further comprises an accelerator pedal sensor, a brake pedal sensor, and a secondary power source, and wherein the engine torque command is based on signals from the accelerator pedal sensor, brake pedal sensor, and a state of charge signal indicative of a state of charge of the secondary power source.

9. The method of claim 5 wherein the hybrid electric vehicle further comprises an accelerator pedal sensor, a brake pedal sensor, and a secondary power source, and wherein the engine speed command is based on signals from the accelerator pedal sensor, brake pedal sensor, and a state of charge signal indicative of a state of charge of the secondary power source.

10. The method of claim 5 wherein the hybrid electric vehicle further comprises a power transfer unit adapted to be driven by the engine, and wherein the maximum engine speed command is based on at least one of a vehicle speed value and a selected gear ratio of the power transfer unit.

11. A method of controlling engine torque in a hybrid electric vehicle, the method comprising:

comparing an engine speed command to a maximum engine speed command;

comparing an engine speed value to the engine speed command; and adjusting an engine torque command to control engine speed when the engine speed command is within a predetermined threshold to the maximum engine speed command and the engine speed value exceeds the engine speed command by at least a predetermined amount.

12. The method of claim 11 wherein the engine torque command is not adjusted if the engine speed command is not sufficiently close to the maximum engine speed command.

13. The method of claim 11 wherein the engine torque command is not adjusted if the engine speed value does not exceed the engine speed command by at least the predetermined amount.

14. The method of claim 11 wherein the engine speed command is within the predetermined threshold to the maximum engine speed command if the engine speed command is greater than the maximum engine speed command reduced by a first predetermined constant value.

15. The method of claim 11 wherein the step of adjusting the engine torque command further comprises calculating an error value and calculating an engine torque adjustment value based on the error value.

16. The method of claim 15 wherein the error value is based on the engine speed and the engine speed command.

17. The method of claim 15 wherein the engine torque reduction value is based on the error value and proportional and integral gain values.

18. The method of claim 15 wherein the step of adjusting the engine torque command further comprises decreasing the engine torque command by the engine torque adjustment value.

19. The method of claim 18 further comprising applying the engine torque command to decrease engine output torque.

20. The method of claim 11 wherein the step of adjusting the engine torque command further comprises adjusting an engine output torque based on the engine torque command.

* * * * *